June 28, 1966 J. M. DAVIN ET AL 3,257,857
FRICTION DRIVE APPARATUS
Filed Aug. 30, 1960 6 Sheets-Sheet 1
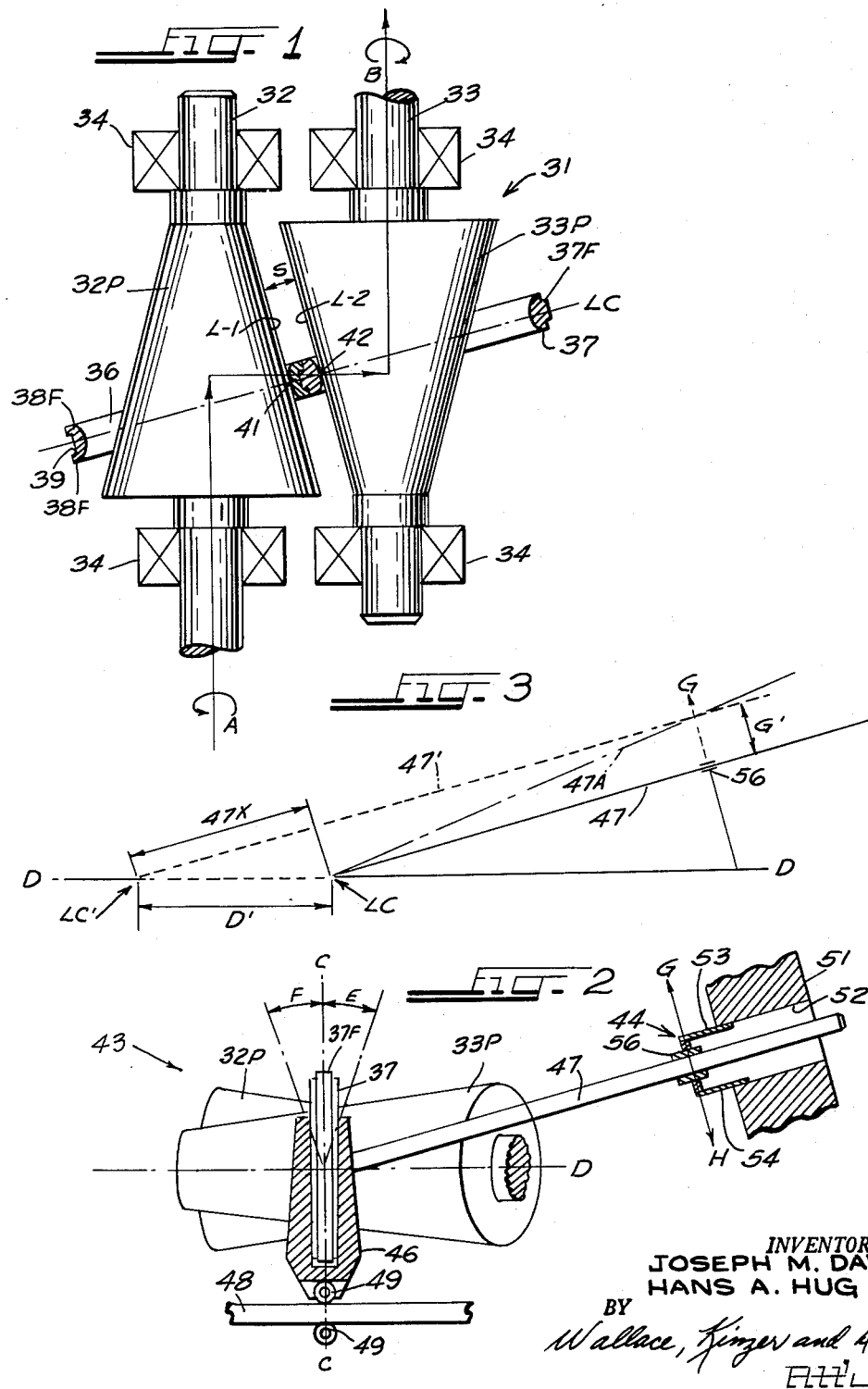
INVENTORS:
JOSEPH M. DAVIN
HANS A. HUG
BY
Wallace, Kinzer and Horn
Attys.

June 28, 1966  J. M. DAVIN ET AL  3,257,857
FRICTION DRIVE APPARATUS
Filed Aug. 30, 1960  6 Sheets-Sheet 2
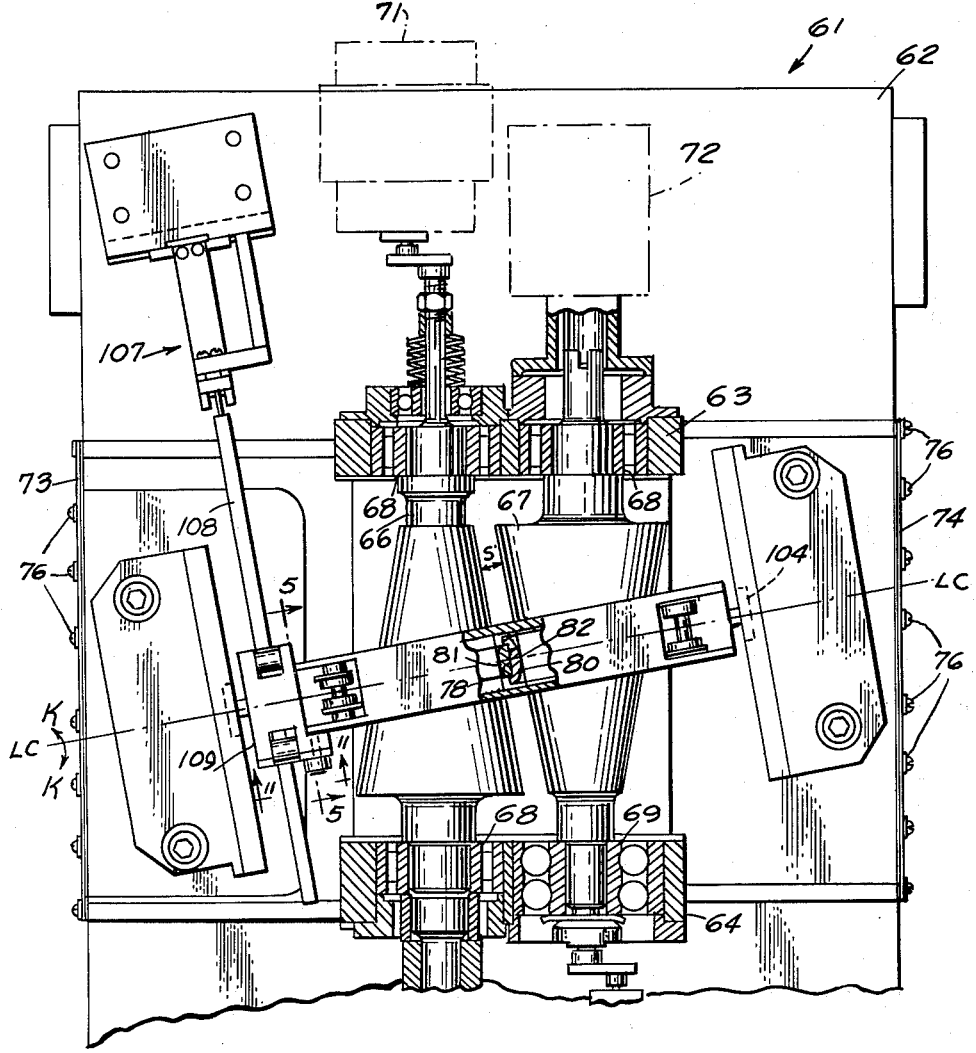
INVENTORS:
JOSEPH M. DAVIN
HANS A. HUG
BY
Wallace, Kinzer and Dorn
ATT'YS.

June 28, 1966  J. M. DAVIN ET AL  3,257,857
FRICTION DRIVE APPARATUS
Filed Aug. 30, 1960  6 Sheets-Sheet 3
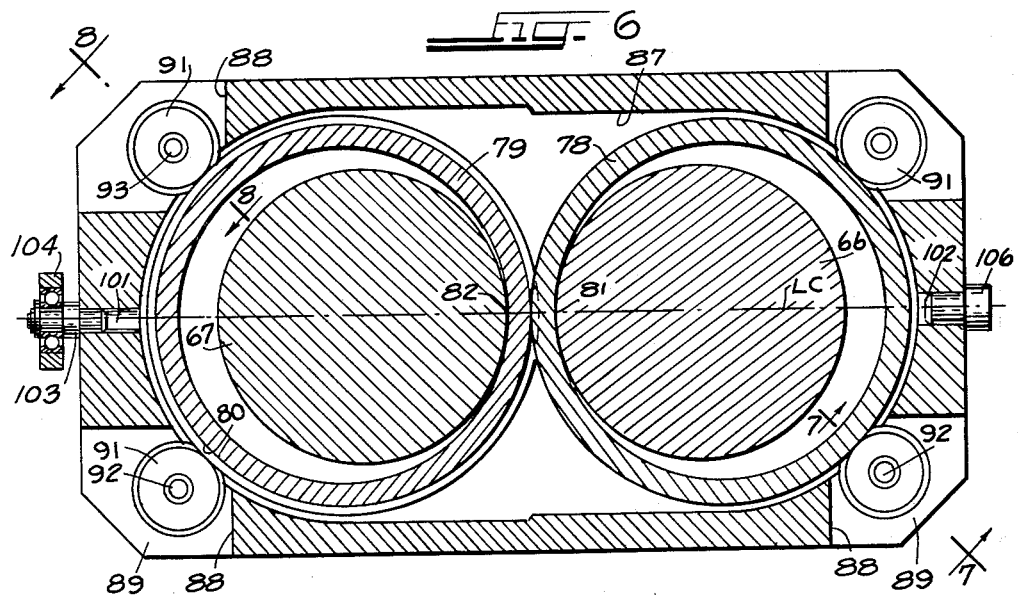
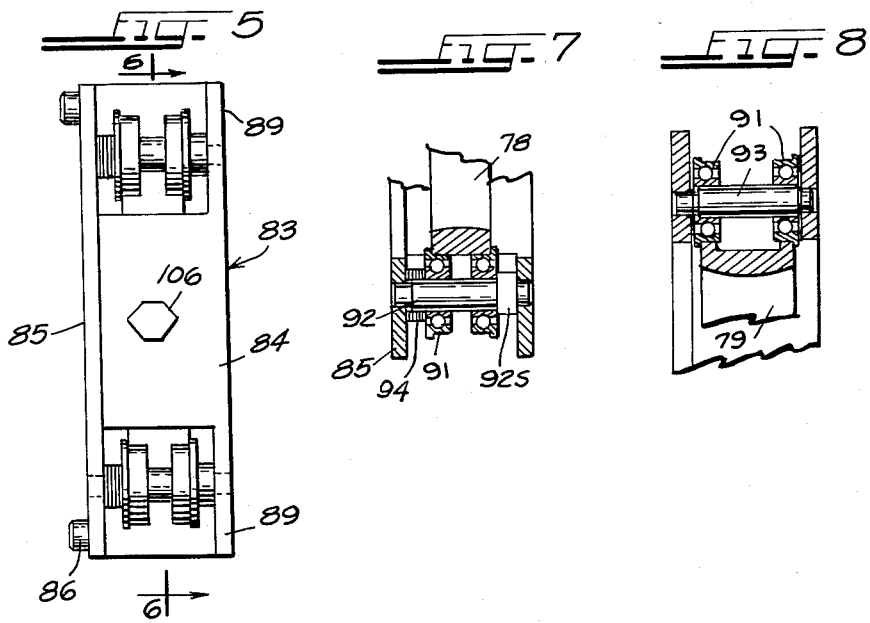
INVENTORS:
JOSEPH M. DAVIN
HANS A. HUG
BY
Wallace, Kinzer and Dorn
Att'ys.

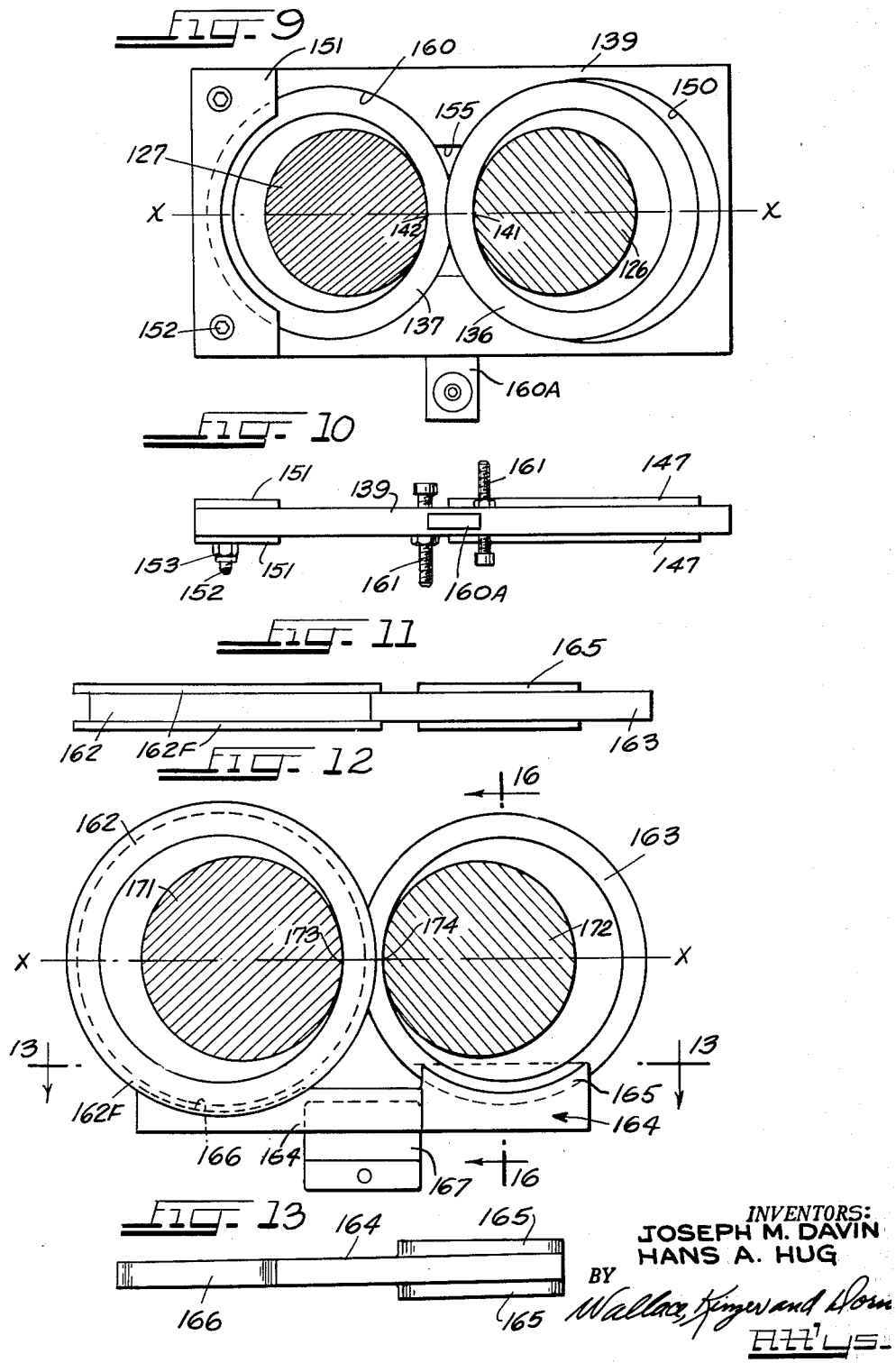

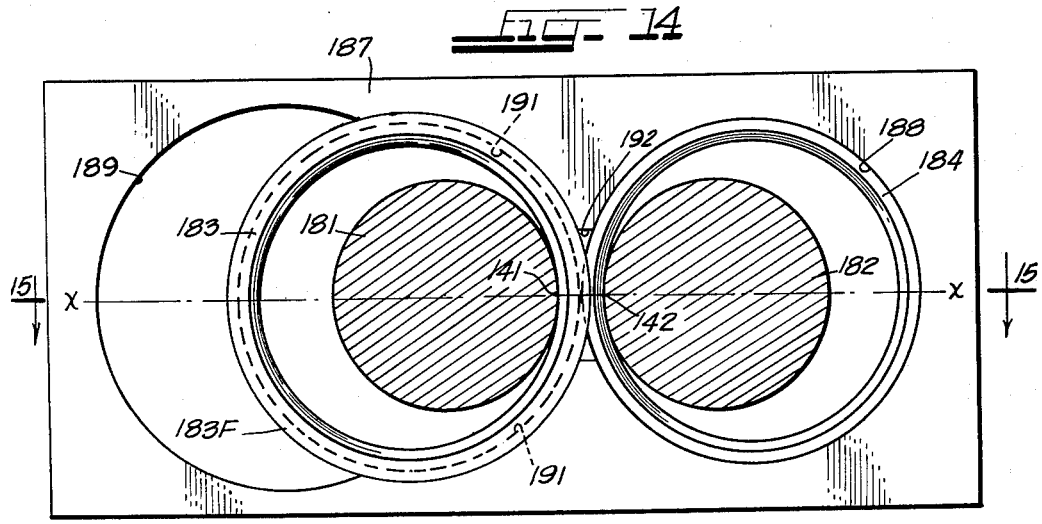
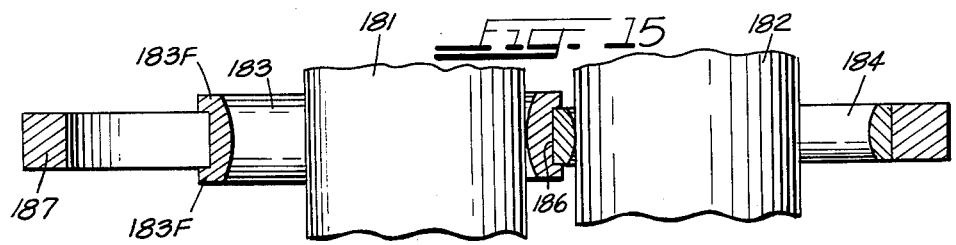
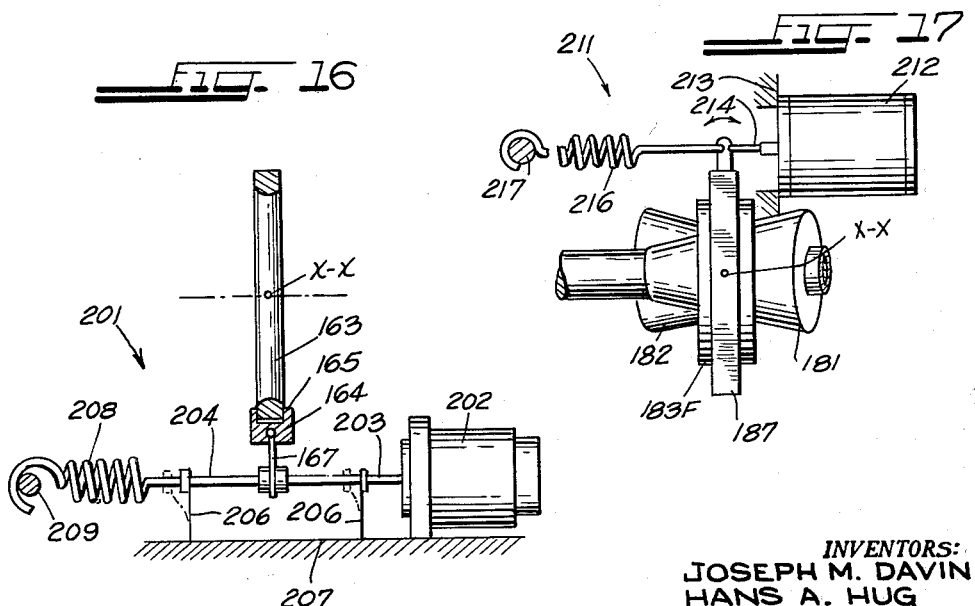
INVENTORS:
JOSEPH M. DAVIN
HANS A. HUG

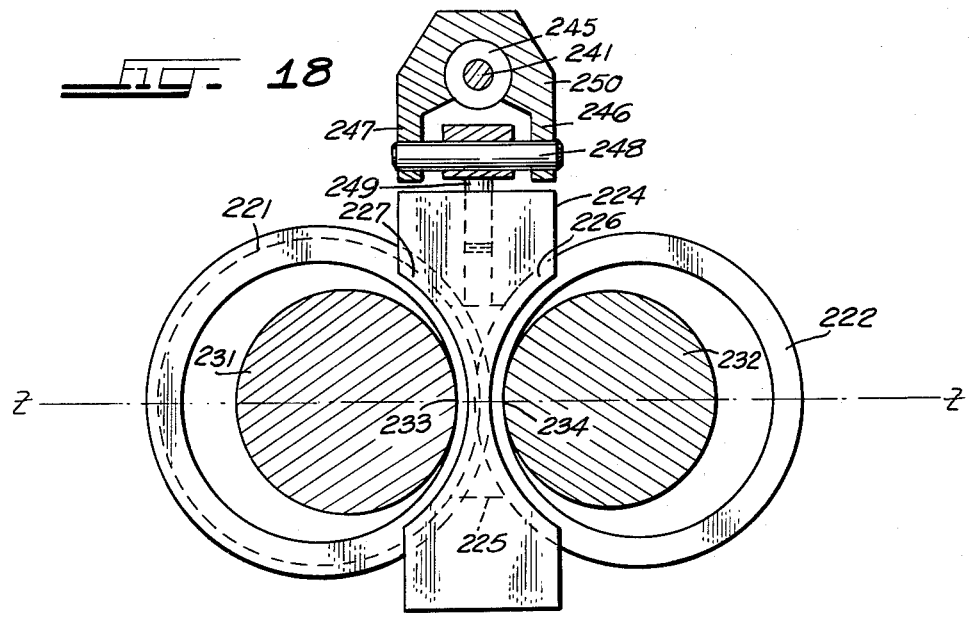
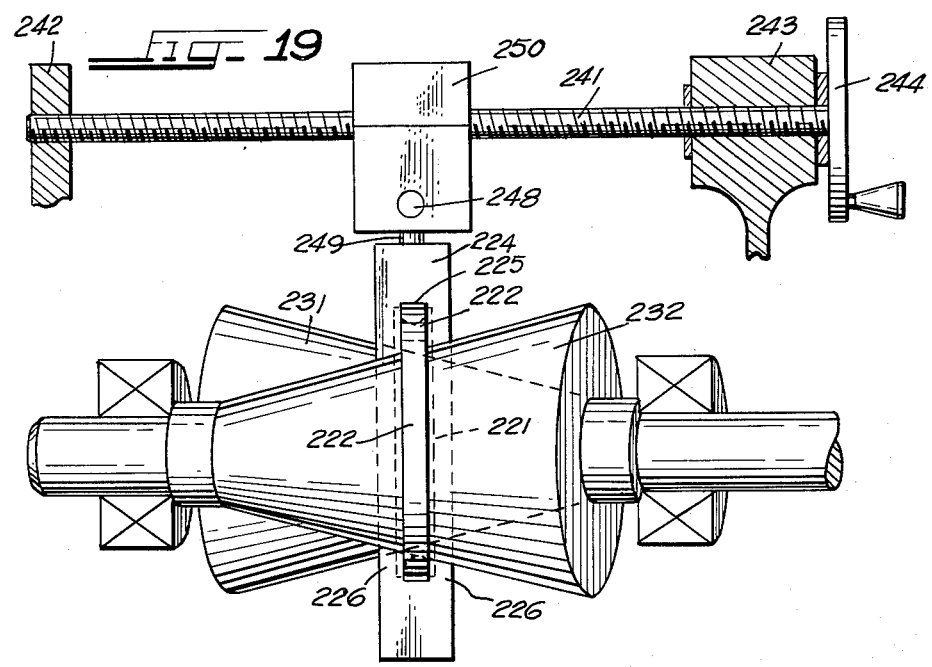

United States Patent Office 3,257,857
Patented June 28, 1966

3,257,857
FRICTION DRIVE APPARATUS
Joseph M. Davin and Hans A. Hug, Norwood, Mass., assignors, by mesne assignments, to American Brake Shoe Company, New York, N.Y., a corporation of Delaware
Filed Aug. 30, 1960, Ser. No. 52,807
10 Claims. (Cl. 74—192)

This invention relates to friction drive apparatus of the general kind in which a roller member is frictionally engaged with the periphery of a rotatable shaft and is axially movable therealong. More particularly, this invention relates to a novel construction for the roller member and associated structure.

This application is a continuation-in-part of both application Serial No. 841 by Joseph M. Davin and Hans A. Hug, filed Jan. 6, 1960, and application Serial No. 19,621 by James L. Coakley and Hans A. Hug, filed Apr. 4, 1960.

In friction drive apparatus of the general kind noted hereinabove it has heretofore been proposed to utilize a pair of roller members in conjunction with a pair of spaced shafts to afford a friction drive connection between the shafts. The shafts have a common axial plane and the adjacent peripheral surfaces of the two shafts intersect the common axial plane in parallel spaced lines. The roller members are positioned between the shafts and are frictionaly engaged with respective ones of the shafts on these lines and are also frictionally engaged with one another. Thus, the roller members afford a friction drive between the shafts. The areas of engagement of the roller members with their respective shafts and with each other are all located on an axis which is preferably perpendicular to the aforesaid parallel lines, in the axial plane, defined by the adjacent peripheral surfaces of the shafts. The roller members are tiltable about this axis to inclinations wherein the rotation of the shafts cause the roller members to traverse helical paths on the peripheries of the shafts and to move axially of the shafts along the aforesaid parallel lines. One or both of the shafts may be formed with a conical peripheral surface whereby movement of the roller members axially along the shafts continuously varies the ratio of the speeds of rotation of the two shafts, affording a variable speed drive mechanism.

It is a primary object of this invention to interlock the roller members with one another at the areas of mutual frictional engagement so that the roller members are self-aligning. Thus, the interlocked construction of the roller members provides equal angular tilting and axial movement of the two roller members with respect to the rotatable shafts.

In a dual-shaft dual-roller member friction drive of the kind noted hereinabove it has been found particularly advantageous to utilize roller members having an annular configuration. The annular roller members or rollrings each have an inner surface frictionally engaged with a respective one of the shafts and an outer surface frictionally engaged with the other roller member. The present invention provides a pair of axially spaced and radially projecting flanges on one of the annular roller members. The flanges are slidably engaged with opposed lateral surfaces of the other roller member, whereby tilting of either roller member effects a like tilting of the other roller member, and the two roller members are movable as a unit axially along the rotatable shafts; this flanged construction of annular roller members represents a specific object of the present invention.

In accordance with the present invention a deck structure is preferably associated with the roller members for imparting a tilting force thereto. It is a further object of the present invention to provide a quite simplified deck for this purpose. It is a related object to include in the deck a part which coacts with radially projecting flanges on a roller member to effect simultaneous tilting of two interlocked roller members in a novel manner.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a plan view of a variable speed drive device incorporating an interlocked roller member mechanism constructed in accordance with this invention;

FIG. 2 is a side elevation view showing one embodiment of a control arrangement which can be utilized with the variable speed drive device shown in FIG. 1 for selecting a variable output speed;

FIG. 3 is a diagramatic side elevation view illustrating the operative association of the elements of the control arrangement illustrated in FIG. 2;

FIG. 4 is a plan view of a combined variable speed drive device and servo-mechanism control which incorporates a deck assembly constructed in accordance with one form of this invention;

FIG. 5 is an enlarged elevation view of the deck assembly taken generally in the direction of the arrows 5—5 in FIG. 4;

FIG. 6 is a sectional view taken approximately in the direction of the arrows 6—6 in FIG. 5;

FIG. 7 is a detail view taken generally in the direction of the arrows 7—7 in FIG. 6;

FIG. 8 is a detail view taken approximately in the direction of the arrows 8—8 in FIG. 6;

FIG. 9 is an elevation view of another form of a deck assembly constructed in accordance with the present invention;

FIG. 10 is a bottom view of the deck assembly illustrated in FIG. 9;

FIG. 11 is a plan view of a rollring deck assembly comprising another embodiment of the invention;

FIG. 12 is an elevation view of the deck assembly of FIG. 11;

FIG. 13 is a plan view of a deck member incorporated in the deck assembly illustrated in FIG. 12;

FIG. 14 is an elevation view of still another deck assembly constructed in accordance with the invention;

FIG. 15 is a sectional view taken substantially along the line indicated by the arrows 15—15 in FIG. 14;

FIG. 16 is a fragmentary view in side elevation of a control mechanism which is especially adapted for use with the deck assembly illustrated in FIG. 12;

FIG. 17 is a framgentary side elevation view of a control mechanism which can be utilized with various forms of deck mechanisms;

FIG. 18 is a front elevation view, partly in section, of another embodiment of the invention; and FIG. 19 is a partly sectional side elevation view of a control mechanism used with the deck assembly of FIG. 18.

In FIG. 1 a roller member mechanism constructed in accordance with one embodiment of the present invention is shown incorporated in a friction drive apparatus of the general kind described hereinabove and adapted to function as a variable speed drive device. The variable speed drive device is designated generally by the reference numeral 31, and includes a pair of parallel shafts 32 and 33 which are rotatably mounted within suitable bearings 34. The shafts 32 and 33 have a common axial plane and are formed with conical-shaped peripheral surfaces 32P and 33P, respectively, in the central portions thereof. The adjacent surfaces of the conical shafts intersect the common axial plane in two parallel lines L–1 and L–2 and define a space S of uniform width in the plane of the longitudinal axes of the shafts.

In this instance the roller member mechanism includes a first annular roller member or rollring 36 disposed in encircling relation with the conical periphery 32P of the shaft 32. In like manner an annular roller member or rollring 37 is disposed in encircling relation with the conical periphery 33P of the shaft 33.

In accordance with the present invention the rollring 37 is formed with a radially projecting flange 37F around its outer periphery while the rollring 36 is formed with a pair of axially spaced and radially projecting flanges 38F. The flanges 38F define a recess 39 complementary to the flange 37F so that the two rollrings are interlocked at the areas of mutual frictional engagement in the portions of the rollrings intermediate the shafts 32 and 33 with the flanges 38F slidably engaged with opposed surfaces of the rollring 37.

The combined width of the rollrings is related to the space S in a manner such that the inner surfaces of the rollrings are frictionally engaged with the shafts 32 and 33 along the respective lines L–1 and L–2 at areas indicated by the respective reference numerals 41 and 42 in FIG. 1. These areas of contact are essentially of elliptical configuration by reason of the relationship of the relative diameters of the rollrings and the shafts and the convex curve of the inner peripheries of the rollrings. That is, there is some resilience to the rollrings so that an arcuate portion of each rollring is engaged with a shaft. Thus, upon a force being applied to rotate the shaft 32 in the direction of the arrow A in FIG. 1, the shaft 33 is caused to rotate in the opposite direction, as indicated by the arrow B, by reason of the frictional drive afforded by the portions of the rollrings 36 and 37 interposed in the space S between the shafts. The rollrings 36 and 37 also rotate with the respective shafts and thus rotate in opposite directions with respect to one another.

The relationship of the speeds of rotation of the two shafts is dependent on the relative lengths of the shaft radii at the points of engagement with the rollrings. Thus, the speed ratio of the shafts is dependent upon the positions of the rollrings along the longitudinal axes of the two shafts. Therefore, if the shaft 32 is driven at a constant rotational speed, the speed of rotation of the shaft 33 may be varied from a maximum to a minimum by moving the rollrings 36 and 37 from the largest diameter portion of the conical surface 32P to the smallest diameter portion, or in an upward direction as viewed in FIG. 1.

The interlock afforded by the flanged construction of the rollrings 36 and 37 enables the rollrings to be moved as a unit along the longitudinal axes of the shafts 32 and 33 in either an upper or lower direction as viewed in FIG. 1 to effect any desired ratio of speeds between the shafts 32 and 33. The rollrings 36 and 37 are tiltable about an axis LC which passes through the centers of the rollrings and through the areas of engagement 41 and 42 with the shafts 32 and 33. Normally, the rollrings are disposed so that a line CC, see FIG. 2, passing vertically through the medial portion of each rollring is perpendicularly disposed to a plane DD defined by the longitudinal axes of the shafts 32 and 33. In this equilibrium position the areas of contact 41 and 42 each traverse a circular path about the conical surfaces 32P and 33P, and there is no movement of the rollrings along the longitudinal axes of the shafts. However, should the rollrings be tilted from this equilibrium position about the axis LC in the direction of the arrows E or F in FIG. 2, the areas of contact 41 and 42 must traverse helical paths along the surfaces 32P and 33P, whereupon the frictional engagement between the rollrings and shafts causes the rollrings to move in a longitudinal direction with respect to the shafts. The direction of such movement and rate of progression of the rollrings are dependent upon the direction and extent of tilt of the rollrings. The rollrings continue to move longitudinally on the shafts until returned to the equilibrium position as illustrated in FIG. 2, and the interlocking flanged construction of the rollrings assures that the rollrings 37 and 38 are at all times disposed at the same angular inclination and maintained in coincident alignment with one another regardless of the axial position along the shafts.

The force required to effect tilting of the rollrings is relatively small so long as the shafts 32 and 33 are being rotated. This is true even though the rollrings may be pressed into quite tight engagement with the shafts to thereby insure that large torques can be transmitted between the shafts. The variable speed drive device 31 thus enables a continuously variable output speed to be obtained in a device which is suitable for large power applications but requires a comparatively small control force for effecting a variation in the output speed.

The rollrings 36 and 37 may be tilted by a servo-mechanism which applies an input signal of a predetermined magnitude to cause the rings to move toward a new position corresponding to a desired output speed. The servo-mechanism also sums up the movement of the rollrings and returns the rollrings to an equilibrium position at the exact location along the shafts corresponding to the new output speed as selected by the input signal.

One form of a servo-mechanism which functions in this manner is illustrated in FIG. 2 and is designated generally by the reference numeral 43. The servo-mechanism 43 includes three operative elements—a signal input apparatus 44, an output or follower member 46, and an interconnecting linkage in the form of a lever arm 47. As applied to the variable speed drive device 31, illustrated in FIG. 1, the output member 46 is in the form of a deck or yoke which engages the opposite faces of each of the rollrings 36 and 37 and affords the means for tilting the rollrings in the direction of either the arrows E or F in FIG. 2. Tilting of the rollrings 36 and 37 causes the rollrings to move longitudinally of the shafts whereby the axis of tilt LC moves along the line D—D as viewed in FIG. 2. The lever arm 47 is rigidly connected to the yoke 46, so that movement of the portion of the lever arm that is associated with the signal input apparatus 44 in the direction of the arrows G or H causes the yoke to tilt about the axis LC, which projects as a point in FIG. 2.

For the purpose of assuring straight-line movement of the yoke 46 a yoke guide 48 is provided and rollers 49, mounted at the lower end of the yoke, support the yoke on the yoke guide 48.

It should be noted that the rollrings are permitted movement within the yoke in a direction transverse to the surface of the yoke guide 48 so that vertical oscillations of the rollrings due to imperfect mating of the shafts, dust, or other factors do not adversely affect operation of the servo-mechanism.

The input signal apparatus 44 comprises a fixed support 51 which is formed with a bore or recess 52 for receiving the free end of the lever arm. A pair of flexure member 53 and 54 are mounted at one end within the recess 52 and support an arm guide 56 at their opposite ends. The lever arm 47 is slidably mounted within the arm guide 56 but is movable in the direction of the arrows G or H by an input signal applied to the apparatus 44.

The manner in which the various elements of the servo-mechanism 43 are interrelated one with another may be visualized as an expandable proportional triangle, and the operation of the servo-mechanism will be described with particular reference to FIG. 3, which graphically illustrates this relationship. The input signal apparatus 44 is movable in a first linear direction which is entirely contained within a given plane. The output or yoke member 46 is also movable in a second linear direction which is entirely contained within the same plane. The longitudinal axis of the lever arm 47 is also disposed within this plane and defines a triangle with lines extended along the first and second directions of movement of the respective input apparatus and output member. Thus, and as viewed in FIG. 3, the axis of the lever arm 47 defines a triangle, as shown in solid outline, with the lines G and D corresponding to the directions of movement of the input apparatus 44 and the output yoke 46. Whenever the relationship of the interior angles of this triangle is as shown in the bold outline, the rollrings are disposed at the equilibrium or balanced position as illustrated in FIG. 2. However, should an input signal be applied to the servo-mechanism 43 causing one leg of the triangle to be extended by the amount G′, this relationship of the interior angles is changed and the lever arm 47 is angularly inclined to the position shown by the phantom line 47A wherein the rollrings are tilted in the direction of the arrows F in FIG. 2. This causes the rollrings and the output member 46 to move axially along the shafts a distance D′, as indicated in FIG. 3, to a new position wherein the lever arm 47 is restored to its original inclination in the position 47′ as indicated in FIG. 3. Thus, a new triangle is defined which is proportional to the original triangle as shown in the bold outline. In this instance the effective length of the lever arm is increased by the amount 47X. An input signal in the direction of the arrow H causes a repositioning of the elements in a smaller proportional triangle. It will be recognized that the amplitude gain, or the ratio of output displacement to the input displacement can be adjusted by a suitable choice of the relationship of the interior angles of the triangle in the equilibrium condition of the system. To enable this relationship of the sides and angles of the triangle to be restored, the portion of the lever arm 47 intermediate the points associated with the yoke 46 and the arm guide 56 must be of a variable length, and in the embodiment illustrated in FIG. 2 this is realized by the sliding fit of the lever arm 47 within the arm guide 56.

Alternately, the lever arm could be pivotally attached to the support 51 and the arm guide fixed to the yoke. In this case the lever arm would be allowed movement with respect to the yoke. Other variations are possible, but the important feature of the servo-mechanism 43 is the manner in which the various elements coact to form a proportional triangle at each balanced or equilibrium condition of the servo-mechanism to obtain linearity of response of the output displacement to the input signal.

Another form of mechanism for controlling the angular inclination of a pair of roller members is illustrated in FIG. 4 as incorporated in a servo-mechanism controlled variable speed drive mechanism designated generally by the reference numeral 61. The mechanism 61 includes a rigid base 62 which is formed with a pair of upstanding ribs 63 and 64. Conical shafts 66 and 67, whose conical surfaces are complementary shaped and oppositely disposed, are rotatably mounted at opposite ends within the ribs 63 and 64 by bearings 68 and 69. The shafts 66 and 67 may preferably be formed with shoulder flanges as illustrated for engaging the lateral faces of the bearings and thereby accurately retaining the shafts in accurate alignment with the base 2. The shaft 66 is driven at one end by any suitable means, such as an electric motor, and a tachometer generator 71, as indicated by the phantom outline in FIG. 4, may be installed on an opposite end thereof for test or maintenance purposes. A pump 72, or similar power absorptive device is mounted on an adjacent end of the shaft 67. A tachometer generator or other similar speed measuring device may be attached to the opposite end of the shaft 67 if desired.

Side plates 73 and 74 are preferably mounted on the base 62 and ribs 63 and 64 as by a plurality of cap screws 76, while a top cover plate, not illustrated, may be mounted on the upper ends of the ribs 63 and 64. The configuration and disposition of the conical surfaces of the shafts are the same as that of the shafts 32 and 33 as illustrated in FIG. 1. Thus, the adjacent peripheries of the shafts 66 and 67 defines a space S′ of uniform width in the plane of the longitudinal axes of the shafts.

Also, as in the embodiment illustrated in FIG. 1, each of the shafts 66 and 67 is encircled by respective rollrings 78 and 79, and the portions of these rollrings intermediate the shafts 66 and 67 are engaged on their inner peripheries at areas 81 and 82 with respective shafts 66 and 67 and are engaged at their outer peripheries with each other. Thus, the rollrings afford a frictional drive connection between the input shaft 66 and the output shaft 67. Preferably, and as illustrated in FIG. 4, the outer periphery of the rollring 79 includes a pair of axially spaced, radially projecting flanges defining an annular recess 80 for receiving the rollring 78 in interlocking relation therewith. Thus, in this instance the flanges of the rollring 79 are slidably engaged with the opposed lateral faces of the rollring 78. The rollrings 78 and 79 are movable in either direction along the longitudinal axes of the shafts 66 and 67 for the purpose of effecting a change in the relative rotational speeds of the two shafts.

In accordance with the form of the invention illustrated in FIG. 4, the rollrings 78 and 79 are mounted within a deck assembly 83 rather than being contained within a yoke as illustrated in FIG. 2. The manner in which the rollrings 78 and 79 are mounted within the deck assembly 83 is shown in detail in FIGS. 5-8. In these figures it is seen that the deck assembly 83 includes a deck body 84 and a cover plate 85 mounted thereon by a plurality of cap screws 86. The interior of the deck body 84 is formed to have a somewhat loop-shaped central opening 87 which is slightly larger than the exterior diameter of the rollrings 78 and 79. Recesses 88 are formed in each corner of the deck body and communicate with the opening 87. The recesses 88 do not extend for the full width of the deck body so that flanges 89 extend across the base of the recesses at the corners of the deck assembly.

With reference now to FIGS. 7 and 8, it is seen that a series of flanged guide rollers or bearings 91 are positioned within the recesses 88 by shafts 92 and 93, which are in turn mounted within corresponding openings formed in the flanges 89 and the corners of the cover plate 85. The flanged bearings 91 engage the outer peripheries of the rollrings 78 and 79 to support the rollrings for rotation within the deck body and additionally engage the opposite faces of each rollring to maintain an axial alignment of the rollrings within the deck body. Inasmuch as the rollring 78 is smaller in axial length than the rollring 79, each of the shafts 92 is preferably formed with a shoulder 92S for engaging one face of the bearing to thereby retain the bearing 91 in position within the deck body while a plurality of shims 94 maintain the desired spacing between the other face of the flanged bearing 91 and the cover plate 85.

The deck body 84 is formed with cylindrical openings 101 and 102 at each end which are centered about the axis LC passing through the centers of the rollrings 78 and 79. The opening 101 receives a bearing pin 103 therein, which bearing pin is formed with a shoulder at the central portion thereof so as to facilitate mounting of a ball bearing 104 on the free end thereof. A hexagonal head location pin 106 is mounted within the opening 102 for a purpose presently to be described.

With reference now to FIG. 4, the rollrings 78 and 79 and the deck assembly 83 are adapted to be tilted as a unit about the axis LC in the direction of the arrows KK to effect a repositioning of the rollrings along the longitudinal axis of the shafts 66 and 67 and thereby vary the output speed of the shaft 67.

For the purpose of effecting tilting of the deck assembly 83, means for applying an input signal, designated generally by the reference numeral 107, are connected to the deck assembly 83 through a lever arm 108 and a lever arm housing assembly 109. The housing assembly 109 is associated with the pin 106.

The input signal means 107 and lever arm 108 comprise elements of a proportional triangle servo-mechanism which is generally similar in operation to the mechanism described hereinabove with reference to FIG. 2 and therefore will not be further described. A complete description of this and associated structure is set forth in our copending application Serial No. 841, filed Jan. 6, 1960, and noted hereinabove.

It should be noted that the deck assembly 83 is effective not only to control the angle of inclination of the rollrings 78 and 79 but also serves to maintain the rollrings in alignment with one another by reason of the flanged engagement of the guide rollers 91 with the rollrings.

In FIGS. 9 and 10 there is illustrated another form of a deck assembly which may be utilized with various forms of friction drive apparatus of the general kind described. In this instance a pair of rotatable shafts 126 and 127 have respective rollrings 136 and 137 frictionally engaged therewith at areas 141 and 142. The rollring 136 includes radially projecting flanges 147 which are slidably engaged with the opposed faces of the rollring 137 to afford an interlock at the areas of mutual frictional engagement of the rollrings with one another, whereby the rollrings are tiltable and movable axially as a unitary member with respect to the shafts. As illustrated in FIGS. 9 and 10 a deck member 139 is formed with an enlarged circular-shaped opening 150 in one portion thereof and a second circular-shaped opening 160 in another portion thereof. The deck member 139 also includes an opening 155 which forms a throat interconnecting the circular openings 150 and 160. The diameter of the opening 150 is somewhat larger than the largest external diameter of the flanged rollring 136 so that the rollring 136 may be positioned within the opening 150 and thereafter shifted toward the throat 155, whereupon the flanges 147 are engaged with and are slidable on the opposed laterally extending surfaces of the deck member 139, as illustrated in FIGS. 9 and 10. The diameter of the opening 160 is however substantially the same as the external diameter of the rollring 137. End plates 151 are suitably affixed to the deck member 139, as by the socket head bolts 152 and elastic stop nuts 153 illustrated, and serve to maintain the rollring 137 in lateral alignment within the deck member 139. Thus, with the double-flanged rollring 136 shifted to the position illustrated in FIGS. 9 and 10, the portion of the rollring 137 opposite that engaged by the end plates 151 is interlocked between the flanges 147 of the rollring 136. In this manner, the peripheries of the rollrings 136 and 137 may be frictionally engaged with one another within the throat 155 and the rollrings and deck member 139 are tiltable as a unitary assembly about the axis X—X. For facilitating tilting of the rollrings and deck member 139 a lever member 160A is suitably affixed to the deck member 139.

In FIGS. 11–13 there is illustrated another form of a deck housing assembly constructed in accordance with the present invention. In this form of the deck housing assembly, a double-flanged rollring 162 is adapted to interlock with a rollring 163, as best illustrated in FIG. 11. The rollrings 162 and 163 are also frictionally engaged with respective shafts 171 and 172 at areas 173 and 174. In this instance a quite simplified deck mechanism 164 is formed with a pair of arcuate-shaped flanges 165 which are adapted to engage the opposed lateral surfaces of the rollring 163 on the lower part thereof in the manner illustrated in FIG. 12. The deck member 164 also is formed with an arcuate recess 166 in the upper surface of one end thereof, and this end of the deck member 164 is adapted to be received between the flanges 162F of the rollring 162. A flexure member 167 is suitably attached to the deck member 164 for facilitating tilting of the rollrings and deck member 164 about the axis X—X illustrated in FIG. 12.

In FIGS. 14 and 15 another form of a rollring and deck member arrangement constructed in accordance with the present invention is illustrated. In this instance, a pair of rotatable shafts 181 and 182 have encircling rollrings 183 and 184 frictionally engaged therewith at areas 141 and 142. The rollring 183 includes radially projecting flanges 183F which are slidably engaged with opposed faces of the rollring 184 to afford an interlock at the areas of mutual frictional engagement, as indicated by the reference numeral 186 in FIG. 15.

In the arrangement illustrated in FIGS. 14 and 15 the deck member is quite simply constructed. Thus, a deck member 187 has a generally rectangular configuration in side elevation and is formed with a first circular opening 188 in one end portion thereof and a second, somewhat larger circular opening 189 in the other end portion thereof. The first circular opening 188 is substantially the same diameter as the diameter of the outer periphery of the rollring 184, as is best illustrated in FIG. 14. The second circular opening 189 has a diameter slightly greater than the external diameter of the flanges 183F of the rollring 183. Thus, both the rollrings 183 and 184 may be moved axially into position within the respective openings 189 and 188. The deck member 187 also includes a pair of arcuate surfaces 191 which are shaped complementary to the outer surface of the rollring 183 disposed between the flanges 183F. The arcuate surfaces 191 extend from the circular opening 189 to an opening 192, which in turn opens to the circular opening 188. Thus, after the rollring 183 has been positioned within the circular opening 189, the rollring 183 is shifted to the position illustrated in FIG. 14 wherein the flanges 183F engage both the opposed faces of the rollring 184 and the opposed faces of the deck member 187 which border the arcuate surfaces 191. Thereafter, any tilting of the deck member 187 about the axis X—X effects a like tilting of the rollring 183 and the rollring 184, whereby the entire assembly is movable as a unit axially along the shafts 181 and 182.

In FIGS. 16 and 17 two control mechanisms for effecting tilting of the rollrings and axial positioning of the rollrings with respect to associated shafts are somewhat schematically illustrated. The control mechanism illustrated in FIG. 16 is especially adapted to be utilized with the form of the interlocked rollring and deck member assembly illustrated in FIGS. 11–13. In FIG. 16 the control mechanism is indicated generally by the reference numeral 201 and includes an actuator 202 of any suitable mechanical, electrical, hydraulic, or other kind. A connecting member 203 extends from the actuator and is attached to one end of a shaft 204. The shaft 204 is in turn attached to the flexure 167 of the deck member 164. The shaft 204 is supported for axial movement, as between the positions illustrated by the bold and phantom outlines in FIG. 16, by means of a pair of support flexures 206 which are attached to opposite ends of the shaft 204 and which project upwardly from a fixed member 207 of the overall friction-drive apparatus. A feed-back spring 208 may be attached to an axially movable output member 209 of the overall friction-drive apparatus and also connected to the shaft 204. In this arrangement any axial movement of the output member 209, developed by tilting and axial movement of the rollrings and deck member 164 in response to an input force applied by the actuator 202, is effective to generate a progressively larger feed-back force in the spring 208 which tends to restore the rollrings and deck member 164 to a neutral position wherein the rollrings revolve at a fixed axial position on their respective shafts. This mode of operation is set forth in greater detail in the above-noted application Serial No. 19,621, filed Apr. 4, 1960.

The control mechanism illustrated in FIG. 17 can be readily adapted for operation with the rollring and deck constructions illustrated in FIGS. 9 and 14. In FIG. 17 the control mechanism is indicated generally by the reference numeral 211 and includes an actuator 212 mounted on fixed frame structure 213 of the overall friction drive apparatus. A connecting piece 214 extends from the actuator 212 and is attached to a deck member as 187 for tilting the deck member and associated rollrings about the axis X—X to produce axial movement of the rollrings and deck member with respect to the rotatable shafts as 181 and 182. Additionally, a feed-back spring 216 may be attached to an output member 217 and the deck member for applying a feed-back force to the rollrings and deck member in substantially the same manner as that described hereinabove with reference to the feed-back spring 208 illustrated in FIG. 16. The operation of this form of control mechanism is also described in detail in the above-noted application Serial No. 19,621, filed Apr. 4, 1960.

FIGS. 18 and 19 illustrate another form of deck housing assembly constructed in accordance with the persent invention. This deck assembly includes a double-flanged rollring 221 which is disposed in interlocking relation with a second rollring 222 as best illustrated in FIG. 18. The internal surface of the rollring 221 is frictionally engaged with a shaft 231 at the point 233. Similarly, the internal surface of the rollring 222 is frictionally engaged with a shaft 232 at the point indicated by the reference numeral 234. As in the previously described embodiments of the invention, the shafts 231 and 232 may be of conical configuration, as best shown in FIG. 19. The peripheral surface of the rolling 222, as in the other embodiments, is engaged in frictional rolling contact with the peripheral surface of the rollring 221 intermediate the flanges on the rollring 221.

The assembly shown in FIGS. 18 and 19 further comprises a deck member 224. The deck member 224 is provided with a transverse central slot 225 through which the two rollrings extend into engagement with each other. The deck member 224 is also provided with flanges 226 and 227 which engage the sides of the rollings 222 and 221 respectively. Thus, the deck member 224 holds the two rollrings in alignment with each other and provides a means for tilting the rollrings about an axis Z—Z as explained in detail hereinafter.

The apparatus illustrated in FIGS. 18 and 19 also includes a control mechanism for tilting the deck assembly comprising the deck member or fork 224 and the two rollrings 221 and 222. The control mechanism includes a lead screw 241 which is mounted in bearings in a pair of suitable support members 242 and 243, the lead screw 241 preferably being disposed parallel to the path of travel of the rollrings along the shafts 231 and 232 and being located centrally above the two shafts. A hand wheel 244 is mounted on one end of the lead screw 241 adjacent the support member 243 to provide a means for rotating the lead screw. Of course, a suitable motor or other driving means may be provided for the lead screw 241, particulary where it is desired to provide automatic control of the lead screw mechanism.

A follower or nut 245 is threaded onto the lead screw 241; the nut 245 supports a yoke 250 that is provided with a pair of depending bracket members 246 and 247 (see FIG. 18) which serve to support a pivot pin 248. A hanger pin 249 is suspended from the pivot pin 248 and extends downwardly thereof into an aperture in the center portion of the fork 224. The fit between the hanger pin 249 and the aperture in the fork 224 should be relatively close, so that any pivotal movement of the pin 249 constrains the member 224 to a corresponding pivotal movement.

The operation of the control mechanism and the rollring deck assembly illustrated in FIGS. 18 and 19 is essentially similar to the previously described embodiments of the invention. When it is desired to change the speed ratio between the two shafts 231 and 232, the lead screw 241 is rotated, driving the follower nut 245 and the yoke 250 to the left, or to the right, as seen in FIG. 19. As the follower nut 245 advances along the lead screw, the pin 249, and hence the fork 224, tilts about the axis Z—Z. Consequently, the rollrings advance axially of the shafts 231 and 232, changing the drive ratio of the device. When movement of the follower 245, 250 is interrupted, the rollring deck assembly is again automatically driven to a point at which the rollrings are aligned normal to the shaft axes, leaving the device in a constant speed position determined by the position of the nut 245 on the lead screw 241. Of course, the nature of the change in the speed ratio of the two shafts is determined by the direction in which the follower nut 245 is advanced along the lead screw 241. The lead screw mechanism need not be confined to the particular deck assembly shown in FIGS. 18 and 19, but can be used with the other deck assemblies described hereinabove. Furthermore, the lead screw can be utilized in a servo system, providing the hand wheel 244 is replaced by a suitable servo motor energized from a control source and connected to some form of device for sensing the speed of the driven shaft.

Thus, in accordance with the present invention there is provided a novel interlocked construction of roller members which enables equal angular tilting and axial movement of the roller members with respect to associated shafts to be assured. Additionally, control decks of quite simple construction are readily associated with the interlocked rollrings to achieve effective control of the tilting and axial movement of the roller members.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In friction drive apparatus of the kind in which a pair of spaced rotatable shafts have their longitudinal axes disposed in a common plane and include peripheral surfaces which intersect the common plane in parallel extending lines, drive means interconnecting the shafts for rotation with one another and comprising first and second annular roller members each having an inner periphery frictionally engaged with a respective one of the shafts and an outer perphery frictionally engaged with the other roller member, each roller member being tiltable about the area of frictional engagement with a shaft whereby rotation of the shaft moves the roller member axially of the shaft along said parallel lines, and means including radial flanges on the first roller member for interlocking the roller members with one another at the areas of mutual frictional engagement to provide equal angular tilting and axial movement of the two roller members.

2. In friction drive apparatus of the kind in which a pair of spaced rotatable shafts have their longitudinal axes disposed in a common plane and include peripheral surfaces which intersect the common plane in parallel extending lines, drive means interconnecting the shafts for for rotation with one another and comprising first and second annular roller members each having an inner periphery frictionally engaged with a respective one of the shafts and an outer periphery frictionally engaged with the other roller member, each roller member being tiltable about the area of frictional engagement with a shaft whereby rotation of the shaft moves the roller member axially of the shaft along said parallel lines, means including radial flanges on the first roller member for interlocking the roller members with one another at the areas of mutual frictional engagement to provide equal angular tilting and axial movement of the two roller members, and means for tilting the roller members including a one-piece deck member formed with roller member mounting openings therein and including flanges slidably engaged with opposed surfaces of the second roller member.

3. In friction drive apparatus of the kind in which first and second spaced-apart, rotatable shafts have longitudinal axes contained in a common plane and include peripheral surfaces which intersect the common plane in parallel lines, and first and second roller members are disposed in encircling relation and frictionally engaged with the respective first and second shafts and wherein the roller members are tiltable about the areas of frictional engagement with the shafts and are movable axially of the shafts along said parallel lines by rotation of the shafts, means for maintaining the roller members in alignment and for simultaneously tilting the roller members equal angular amounts, said means including axially spaced flanges projecting radially from the first roller member and slidably engaged with opposed lateral surfaces on the second roller member, said means including also a deck member having a part thereof interfitted in slidable relation between the axially spaced flanges on the first roller member.

4. In friction drive apparatus of the kind in which first and second spaced-apart, rotatable shafts have longitudinal axes contained in a common plane and include peripheral surfaces which intersect the common plane in parallel lines, and first and second roller members are disposed in encircling relation and frictionally engaged with the respective first and second shafts and wherein the roller members are tiltable about the areas of frictional engagement with the shafts and are movable axially of the shafts along said parallel lines by rotation of the shafts, means for maintaining the roller members in alignment and for simultaneously tilting the roller members equal angular amounts, said means including axially spaced flanges projecting radially from the first roller member and slidably engaged with opposed lateral surfaces on the second roller member, said means including also a deck member having a part thereof interfitted in slidable relation between the axially spaced flanges on the first roller member and additional flanges engageable with opposed lateral surfaces on the second roller member.

5. In friction drive apparatus of the kind in which first and second spaced-apart, rotatable shafts have longitudinal axes contained in a common plane and include peripheral surfaces which intersect the common plane in parallel lines, and first and second roller members are disposed in encircling relation and frictionally engaged with the respective first and second shafts and wherein the roller members are tiltable about the areas of frictional engagement with the shafts and are movable axially of the shafts along said parallel lines by rotation of the shafts, means for maintaining the roller members in alignment and for simultaneously tilting the roller members equal angular amounts, said means including axially spaced flanges projecting radially from the first roller member and slidably engaged with opposed lateral surfaces on the second roller member, said means including also a deck member having guide rollers journalled for rotation therein and formed with flanges slidably engaged with the flanges on said first roller member.

6. Friction drive apparatus comprising first and second spaced-apart and rotatable shafts having a common axial plane and include peripheral surfaces which intersect the common plane in parallel lines, a first annular roller member encircling the first rotatable shaft with a portion of its inner periphery engaged with the first shaft, a second annular roller member encircling the second shaft with a portion of its inner periphery engaged with the second shaft, each of said roller members being tiltable about the area of engagement with a shaft whereby rotation of the shaft moves the roller member axially with respect to the shaft along one of said parallel lines, flange means interlocking the roller members and effective to maintain the roller members in predetermined alignment with one another, and deck means which include a part coacting with the flange means for simultaneously tilting the roller members equal angular amounts.

7. Friction drive apparatus comprising first and second spaced-apart and rotatable shafts having a common axial plane and include peripheral surfaces which intersect the common plane in parallel lines, a first annular roller member encircling the first rotatable shaft with a portion of its inner periphery engaged with the first shaft, a second annular roller member encircling the second shaft with a portion of its inner periphery engaged with the second shaft, said first roller member having spaced flanges projecting radially from the outer periphery of the roller member, each of said roller members being tiltable about the area of engagement with a shaft whereby rotation of the shaft moves the roller member axially with respect to the shaft along one of said parallel lines, and deck means for simultaneously tilting the roller members equal angular amounts, said deck means including a portion interfitted between the spaced, radially extending flanges of the first roller member and slidably engaged with the opposed inner surfaces of the flanges.

8. Friction drive apparatus comprising first and second spaced-apart and rotatable shafts having a common axial plane and include peripheral surfaces which intersect the common plane in parallel lines, a first annular roller member encircling the first rotatable shaft with a portion of its inner periphery engaged with the first shaft, a second annular roller member encircling the second shaft with a portion of its inner periphery engaged with the second shaft and having a portion of its outer periphery frictionally engaged with the first roller member, said first roller member having spaced flanges projecting radially from the outer periphery of the roller member and slidably engaged with opposed lateral surfaces of the second roller member to afford an interlock between the roller members effective to maintain the roller members in alignment with one another, each of said roller members being tiltable about the area of engagement with a shaft whereby rotation of the shaft moves the roller member axially with respect to the shaft along one of said parallel lines, and deck means which include a part coacting with said flanges for simultaneously tilting the roller members equal angular amounts.

9. In friction drive apparatus of the kind in which a pair of spaced rotatable shafts have their longitudinal axes disposed in a common plane and include peripheral surfaces which intersect the common plane in parallel extending lines, drive means interconnecting the shafts for rotation with one another and comprising first and second annular roller members each having an inner periphery frictionally engaged with a respective one of the shafts and an outer periphery frictionally engaged with the other roller member, each roller member being tiltable about the area of frictional engagement with a shaft whereby rotation of the shaft moves the roller member axially of the shaft along one of said parallel lines, and means for tilting the roller members, said means including a unitary deck member formed with a pair of intercommunicating roller member mounting openings therein and including flanges slidably engaged with opposed side surfaces of both of said roller members.

10. In friction drive apparatus of the kind in which a pair of spaced rotatable shafts have their longitudinal axes disposed in a common plane and include peripheral surfaces which intersect the common plane in parallel extending lines, drive means interconnecting the shafts for rotation with one another and comprising first and second annular roller members each having an inner periphery frictionally engaged with a respective one of the shafts and an outer periphery frictionally engaged with the other roller member, each roller member being tiltable about the area of frictional engagement with a shaft whereby rotation of the shaft moves the roller member axially of the shaft along one of said parallel lines, and means for tilting the roller members including a one-piece deck member formed with a pair of interconnected roller member mounting openings therein, said deck member encompassing the engaged portions of said rollers and including flanges slidably engaged with opposed surfaces of each of the roller members immediately adjacent the engaged portions thereof.

References Cited by the Examiner

UNITED STATES PATENTS

| | | | |
|---|---|---|---|
| 2,432,442 | 12/1947 | Pourtier | 74—192 |
| 2,583,790 | 1/1952 | Mikina | 74—191 X |
| 2,912,868 | 11/1959 | Preskitt | 74—193 X |
| 2,940,322 | 6/1960 | Uhing | 74—193 X |
| 3,043,149 | 7/1962 | Davin et al. | 74—192 |

DAVID J. WILLIAMOWSKY, *Primary Examiner.*

BROUGHTON G. DURHAM, DON A. WAITE, *Examiners.*

T. W. SHEAR, *Assistant Examiner.*